(12) United States Patent
Georget et al.

(10) Patent No.: US 10,625,977 B2
(45) Date of Patent: Apr. 21, 2020

(54) METHOD AND SYSTEM FOR DETECTING FAULTS AND ABNORMAL WEAR CONDITIONS IN OIL AND GAS WIRELINE LOGGING WINCH UNITS

(71) Applicant: Schlumberger Technology Corporation, Sugar Land, TX (US)

(72) Inventors: Stephane Georget, Abbeville (FR); Oleg Zhdaneev, Moscow (RU)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 307 days.

(21) Appl. No.: 15/294,930

(22) Filed: Oct. 17, 2016

(65) Prior Publication Data
US 2017/0107074 A1    Apr. 20, 2017

(30) Foreign Application Priority Data

Oct. 20, 2015  (EP) .................................... 15290272

(51) Int. Cl.
*B65H 63/00*     (2006.01)
*E21B 47/00*     (2012.01)
(Continued)

(52) U.S. Cl.
CPC ............. *B65H 63/00* (2013.01); *B65H 63/04* (2013.01); *B65H 63/082* (2013.01); *E21B 19/008* (2013.01); *E21B 41/00* (2013.01); *E21B 47/00* (2013.01); *G01M 99/00* (2013.01); *G01M 99/008* (2013.01)

(58) Field of Classification Search
CPC .... E21B 19/008; G01M 99/00; G01M 99/008
See application file for complete search history.

(56) References Cited

U.S. PATENT DOCUMENTS 5,467,833 A * 11/1995 Crain .................... E21B 19/002
166/338
6,595,494 B1 * 7/2003 Roodenburg ........... B66C 13/02
254/277

(Continued)

FOREIGN PATENT DOCUMENTS

WO       2014004515 A1     1/2014

OTHER PUBLICATIONS

International Preliminary Report on Patentability issued in the related PCT application PCT/US2016/057433, dated Apr. 24, 2018 (10 pages).

(Continued)

*Primary Examiner* — Elias Desta
(74) *Attorney, Agent, or Firm* — Eileen Pape (57) ABSTRACT

Systems and methods are provided for detecting potential failures in logging winch systems to enable efficient maintenance are provided. An example of such a system may include a logging winch system that conveys a downhole tool into a wellbore on a cable and a data processing system. The logging winch system may include sensors that measure observed quantities relating to operation of the logging winch system. The data processing system may determine correlation signatures that relate the observed quantities to the operation of the logging winch system and may identify when one or more of the correlation signatures indicates abnormal operation.

20 Claims, 5 Drawing Sheets

(51) Int. Cl.
*G01M 99/00* (2011.01)
*B65H 63/04* (2006.01)
*B65H 63/08* (2006.01)
*E21B 19/00* (2006.01)
*E21B 41/00* (2006.01)

(56) References Cited

U.S. PATENT DOCUMENTS

| | | | |
|---|---|---|---|
| 8,657,531 B2 * | 2/2014 | Rios | ............ E21B 17/015 |
| | | | 405/169 |
| 2006/0136744 A1 | 6/2006 | Lange | |
| 2006/0192188 A1 | 8/2006 | Sanders et al. | |
| 2009/0084543 A1 | 4/2009 | Fitzgerald | |

OTHER PUBLICATIONS

Kanungo, T.;Mount, D. M.;Netanyahu, N. S.; Piatko, C. D.; Silverman, R.; Wu, A. Y. (2002)."An efficient k-means clustering algorithm: Analysis and implementation" (PDF).IEEE Trans. Pattern Analysis and Machine Intelligence 24: 881-892.

International Search Report and the Written Opinion issued in the related PCT Application PCT/US2016/057433, dated Jan. 9, 2017 (11 pages).

\* cited by examiner

FIG. 7

METHOD AND SYSTEM FOR DETECTING FAULTS AND ABNORMAL WEAR CONDITIONS IN OIL AND GAS WIRELINE LOGGING WINCH UNITS

CROSS REFERENCE TO RELATED APPLICATIONS

This application claims the benefit of European Application No. 15290272.2 filed on Oct. 20, 2015, incorporated by reference herein in its entirety.

BACKGROUND

This disclosure relates to detecting potential failures in logging winch systems to enable efficient maintenance.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Many downhole well logging tools may be used to identify characteristics of a well drilled into a geological formation. The measurements from downhole well logging tools may be used to identify characteristics of oil and gas zones in the well; as such, measurements from such downhole tools may be very valuable. There are a number of ways to convey a downhole tool through the well. Some of these involve conveying the downhole tools through the well via a logging winch system. The logging winch system may move the downhole tool through the well using, for example, a wireline cable on a spool.

Because of the great value provided by well logging, it may be desirable to ensure that the logging winch systems that convey some downhole tools remain operational during well logging operations. Logging winch systems, however, are highly complex. Continual preventive maintenance on a fixed maintenance schedule could be used to avoid failure during a well logging operation, but this may be inefficient, since some of the preventive maintenance may be premature. Moreover, while a fixed maintenance schedule may take into account many potentially expected failure modes, other failure modes could arise not accounted for by such a fixed maintenance schedule.

SUMMARY

This summary is provided to introduce a selection of concepts that are further described below in the detailed description. This summary is not intended to identify key or essential features of the subject matter described herein, nor is it intended to be used as an aid in limiting the scope of the subject matter described herein. Indeed, this disclosure may encompass a variety of aspects that may not be set forth below.

Systems and methods are provided for detecting potential failures in logging winch systems to enable efficient maintenance are provided. An example of a method includes collecting, into a processor, several parameters relating to operation of a logging winch system and computing, using the processor, one or more relationships between the parameters using one or more model equations that relate the subset of the parameters to the operation of the logging winch system. The method may also include determining, using the processor, a first correlation signature that mathematically describes the computed relationships and identifying, using the processor, whether the first correlation signature falls outside of a threshold indicative of normal operation of the logging winch system.

An example of a system may include a logging winch system that conveys a downhole tool into a wellbore on a cable and a data processing system. The logging winch system may include sensors that measure observed quantities relating to operation of the logging winch system. The data processing system may determine correlation signatures that relate the observed quantities to the operation of the logging winch system and may identify when one or more of the correlation signatures indicates abnormal operation.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, many downhole well logging tools may be used to identify characteristics of a well drilled into a geological formation. The measurements from downhole well logging tools may be used to identify characteristics of oil and gas zones in the well; as such, measurements from such downhole tools may be very valuable. There are a number of ways to convey a downhole tool through the well. Some of these involve conveying the downhole tools through the well via a logging winch system. The logging winch system may move the downhole tool through the well using a wireline cable on a spool.

Because of the great value of well logging, it may be desirable to ensure that the logging winch systems that convey some downhole tools remain operational during well logging operations. Because logging winch systems are highly complex, this disclosure describes systems and methods for identifying potentially "failure-prone" operation to enable efficient maintenance of logging winch systems. Indeed, logging winch systems have numerous components, and these components may relate to one another in complex ways that can be described by physical quantities. The physical quantities may be understood to be quantities sensed by sensing elements ("observed quantities"), caused by actuating elements ("estimated quantities"), and/or may be predefined ("constants") or input by an operator ("parameters"). Some of these physical quantities are tied, or "bonded" together, by the way the machinery was designed, and by the way all the systems, subsystems, parts and components normally interact with each other. Thus, the relationships between these quantities may be observed over time and/or across different logging winch systems. Variations in the relationships from the average or normal may suggest potentially failure-prone operation. Indeed, specific variations from normal may also suggest specific potentially failure-prone modes that call for specific maintenance.

Figure 1:
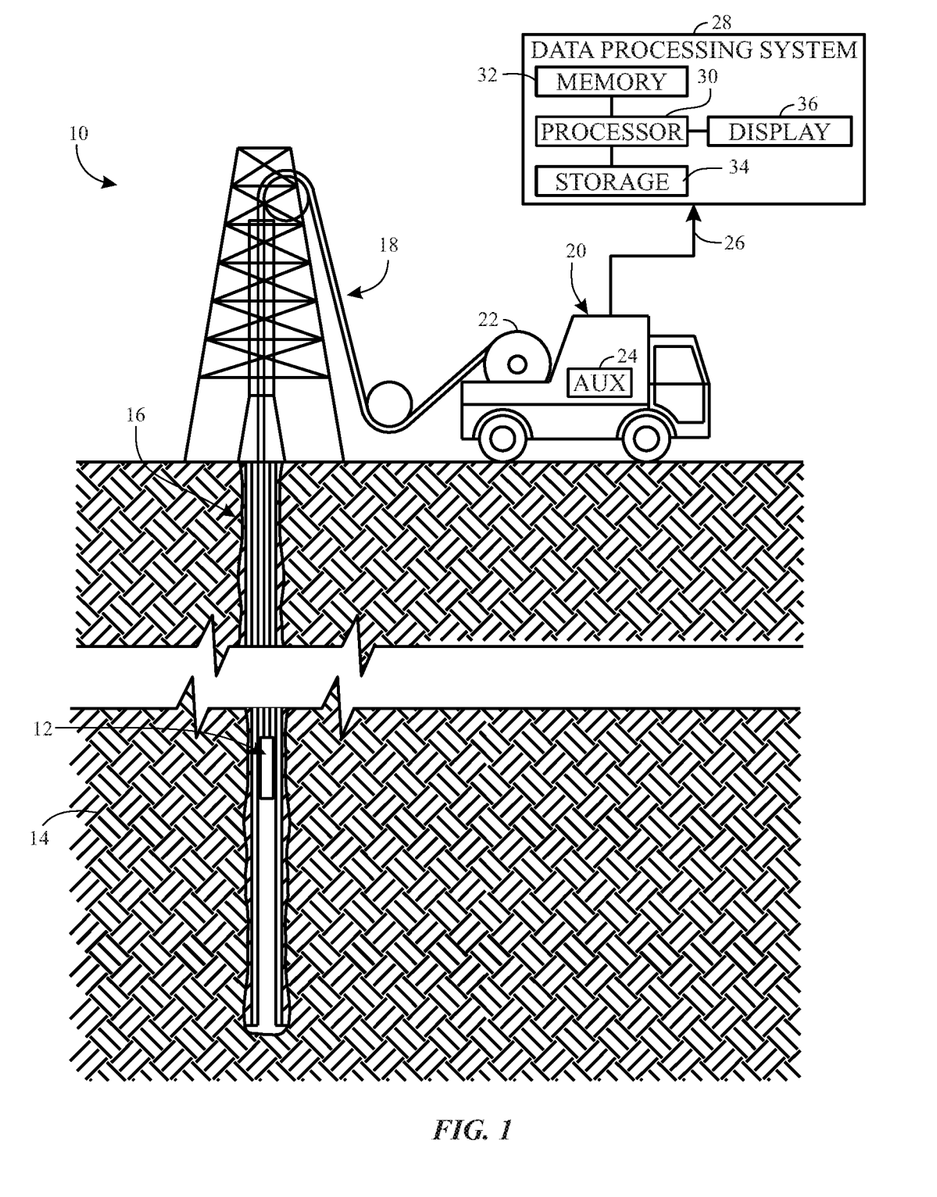
FIG. 1 is a well logging system that employs a logging winch system, in accordance with an embodiment.

With this in mind, FIG. 1 illustrates a well-logging system 10 that may employ the efficient logging winch system maintenance systems and methods of this disclosure. The well-logging system 10 may be used to convey a downhole tool 12 through a geological formation 14 via a wellbore 16. The downhole tool 12 is conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

As discussed further below, the logging winch system 20 may include a number of components that interrelate in specific ways to produce measurable quantities. These quantities may be provided as data 26 to a data processing system 28. The data processing system 28 may correlate the data 26 to identify when the logging winch system 20 is operating in a potentially "failure-prone" mode that suggests that the logging winch system 20 undergo maintenance. The data processing system 28 may run, for example, an instance of a Prognostics and Health Management System (PHMS) by Schlumberger Technology Corporation. The data processing system 28 thus may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be ROM memory, random-access memory (RAM), flash memory, an optical storage medium, or a hard disk drive, to name a few examples. A display 36, which may be any suitable electronic display, may provide a warning or other indication when the data processing system 28 identifies that the logging winch system is flagged for maintenance. The data processing system 28 may be a local component of the logging winch system 20, a remote device that correlates data from other logging winch systems 20, or partly local and partly remote.

Figure 2:
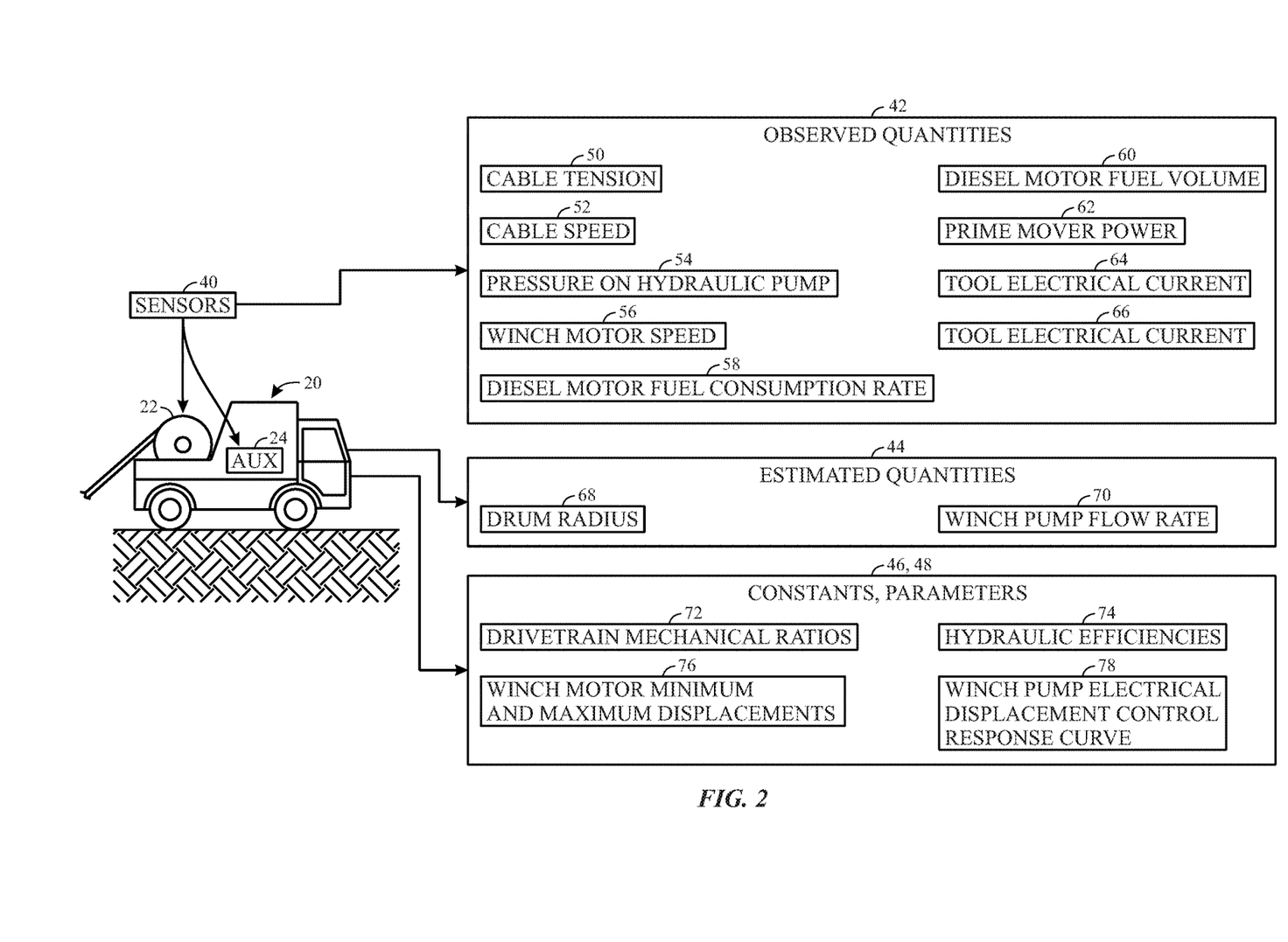
FIG. 2 is a diagram of quantities relating to the logging winch system, in accordance with an embodiment.

FIG. 2 is a block diagram representing some of the physical quantities that can describe the operation of the logging winch system 20. As shown in FIG. 2, the logging winch system 20 may employ numerous sensors 40 that describe many observed quantities 42 of the logging winch system 20. Some other physical quantities that may describe the logging winch system 20 also appear in FIG. 2 as estimated quantities 44 and constants, parameters 46, 48. The physical quantities 42, 44, 46, and 48 may be used by the data processing system 28 to identify potential "failure-prone" operation of the logging winch system 20 to enable efficient maintenance.

The observed quantities 42 may include a variety of measurements from sensors 40 associated with different components of the logging winch system 20. Although the sensors 40 may be associated with different components of the logging winch system 20, these sensors 40 may be connected via any suitable network connections to provide their measurements as data 26 to the data processing system 28. For example, some of the sensors 40 may be connected to an electronic system known as a Wireline Acquisition Front End (e.g., WAFE or eWAFE by Schlumberger Technology Corporation), which may take care of the signal conditioning, digitization, calibration, and computation of some sensor 40 values. The values from those sensors 40 may be broadcast to other systems (e.g., the data processing system 28) via any suitable connection, such as an Ethernet interface, an RS232 bus, or an RS422 bus, to name a few examples. Other sensors 40 may communicate analog measurements according to any convention (e.g., some industry standards may use 0-10V signals or 4-20 mA signals) to an electronic control unit (ECU) on the logging winch system 20. The ECU may digitize the measurement perform calibration and scaling calculations, and provide the values to a controller area network (CAN) bus, from which the data processing system 28 may obtain the values.

It should be appreciated that the observed quantities 42 shown in FIG. 2 and described in this disclosure are provided by way of example. Indeed, implementations of the systems and methods of this disclosure may use other sensor 40 measurements in addition to, or as an alternative to, the observed quantities 42 that will be described below. With this in mind, the observed quantities 42 may include:

Cable tension 50.
Brief description: The cable tension 50 represents the force pulling on the cable 18. It may be measured just after the cable 18 departs from the spool 22.
Units: Newtons.
Measurement device: Cable Mounted Tension Device (CMTD). A CMTD is a device that routes the cable 18 between three wheels, one of which can accept a small displacement, measured by strain gauges. An electronic system such as WAFE or eWAFE takes care of the signal conditioning, digitization, calibration and computation of the actual cable tension 50 value. The cable tension 50 value may be broadcast to any other system by way of an Ethernet interface, an RS232 bus, or an RS422 bus, to name a few examples.

Cable speed 52.
Brief description: The cable speed 52 represents the speed of the cable 18, The cable speed 52 may be measured just after the cable 18 departs from its spool 22.
Units: meters per second.
Measurement device: Integrated Depth Wheels (IDW), a device that uses two wheels tangentially pressing on two opposite sides of the cable 18. The periphery of each wheel travels at cable speed. The wheels' rotational velocity may be measured by respective encoders. Based on the wheel radius, the cable speed 52 can be deduced (e.g., by a WAFE or eWAFE system). The value of the cable speed 52 may be broadcast to any other system by way of an Ethernet interface, an RS232 bus, or an RS422 bus, to name a few examples.

Pressure on hydraulic pump 54.
Brief description: the spool 22 may be driven by a hydraulic winch transmission; as such, the pressure on both sides of a hydraulic pump in the hydraulic winch transmission may provide an indication as to the health of the logging winch system 20. A hydraulic winch transmission includes a set of hydraulic pump and motor. This hydraulic circuit may be instrumented with sensors 40 that sense pressure in the hydraulic winch.
Units: Pascals.
Measurement device: Commercial off-the-shelf pressure transducers may be used. These may communicate their measurements using analog outputs conforming to any suitable convention (e.g., an industry standard of 0-10V signals or 4-20 mA signals) to an Electronic Control Unit (ECU). The exact type of ECU varies depending on the type of hydraulic winch and/or sensors under consideration. The ECU may digitize the analog pressure values, perform calibration and scaling calculations, and make hydraulic pressures available to other systems by way of a CAN bus or any other suitable data transmission network.

Winch motor speed 56.
Brief description: the motor that actually impedes motion to the winch, drum and cable, may be instrumented with a rotational speed sensor.
Units: radians per second.
Measurement device: A commercial off-the-shelf pickup, often based on dual hall-effect motion sensor, may capture the motion of the cogs of a flywheel located inside the hydraulic motor housing. The signal from the sensor may be sent to an ECU, which computes winch motor speed and makes the value available to other systems by way of a CAN bus or any other suitable data transmission network.

Diesel motor fuel consumption rate 58 and/or diesel motor fuel volume 60.
Brief description: when the auxiliary power source 24 is a diesel engine, there may be sensing elements and connectivity to help other systems take advantage of measurements relating to the diesel engine.
Units: cubic meters per second (diesel motor fuel consumption rate 58) and cubic meters (diesel motor fuel volume 60).
Measurement device: The diesel motor fuel consumption rate 58 may be measured using any suitable flow rate sensor. The diesel motor fuel volume 60 may be measured using any suitable liquid level sensor. These may be connected and available via any suitable data transmission network (e.g., CAN/J1939 bus).

Prime Mover Power 62.
Brief description: The prime mover power 62 may refer to diesel engine power output when the auxiliary power 24 is a diesel powerpack. The prime mover power 62 may refer to electrical power output when the auxiliary power 24 is an electrical powerpack.
Units: Watts.
Measurement device: with regard to diesel prime mover power 62, several sensors whose arrangement, signal conditioning and calculation algorithms are proprietary to the engine manufacturer may be used. The diesel prime mover power 62 measurement may be made available to other systems through a fieldbus (e.g., CAN/J1939) or any other suitable data transmission network. With regard to electrical prime mover power 62, the power may be measured using current and voltage sensors, the results of which may be combined to form a power measurement. The power measurement may be communicated to an ECU by way of, for example, a 4-20 mA loop.

Tool electrical current 64.
Brief description: The logging winch system 20 controls the amount of current going to the downhole tool 12. As such, its electrical current consumption is also known to the logging winch system 20.
Units: Amperes.
Measurement device: a system such as WAFE or eWAFE may measure the current sent to the downhole tool 12 and may make this value available by way of Ethernet, RS232, or RS422, to name a few examples.

Tool electrical voltage 66.
Brief description: The logging winch system 20 controls the amount of voltage going to the downhole tool 12. As such, the electrical voltage supplied to the downhole tool 12 is known to the logging winch system 20.
Units: Volts.
Measurement device: a system such as WAFE or eWAFE may measure the voltage provided to the downhole tool 12 and may make this value available by way of Ethernet, RS232, or RS422, to name a few examples.

The exact list or set of physical observed quantities 42 may depend on the technology of the logging winch system 20. Indeed, the list noted above is not meant to be exhaustive, but rather to provide examples of observed quantities 42 that may be used. For instance, for a hydraulically driven winch driven by a Diesel engine, hydraulic pressures and Diesel consumption may be used. For a fully electrically driven winch—in which there may not be a hydraulic pressure measurement—motor current, voltage, and/or frequency may be used instead. For an electro-hydraulically driven winch, a mix of pressures and prime mover electrical consumption may be used.

Other quantities than those measured by the sensors 40 may also describe the logging winch system 20. These may include, as shown in FIG. 2, certain estimated quantities 44 that arise from actuating elements of the logging winch system 20. The estimated quantities 44 may be understood to represent a second family of physical quantities that can be represented by a set of signal conditioners, actuators—whether electrical, mechanical, hydraulic and/or pneumatic—the control of which may be decided by a third family of physical quantities defined by controlling elements of the logging winch system 20. The estimated quantities 44 provide a category of physical quantities that are not expressly measured by the sensors 40, but which can be estimated from the control signals provided by controlling elements to actuating elements of the logging winch system 20, and/or from prior knowledge of the machine design and parts specification of the logging winch system 20. Any suitable estimated quantities 44 may be considered. In the example of FIG. 2, the estimated quantities 44 include a drum radius 68 relating to a radius of spool of cable 18 on the drum 22 at any point in time (e.g., in units of meters) and a winch pump flow rate 70 (e.g., in units of cubic meters per second).

A third family of physical quantities that describe the logging winch system 20 appear in FIG. 2 as constants, parameters 46, 48. These quantities may not be acquired, whether measured or estimated. Rather, these values may be constants 46 that are predefined in the instructions stored on the memory 32 or storage 34 or that part of the software program, or may be parameters 48 that are entered by an operator or at manufacturing time. Some constants, parameters 46, 48 that may be used in the analysis of this disclosure may include drivetrain mechanical ratios 72 and hydraulic efficiencies 74, both of which scalars or unitless quantities, winch motor minimum and maximum displacements 74 (e.g., in units of meters cubed per radian), and/or a winch pump electrical displacement control response curve 78 (e.g., in units of amperes vs. meters cubed per radian).

Figure 3:
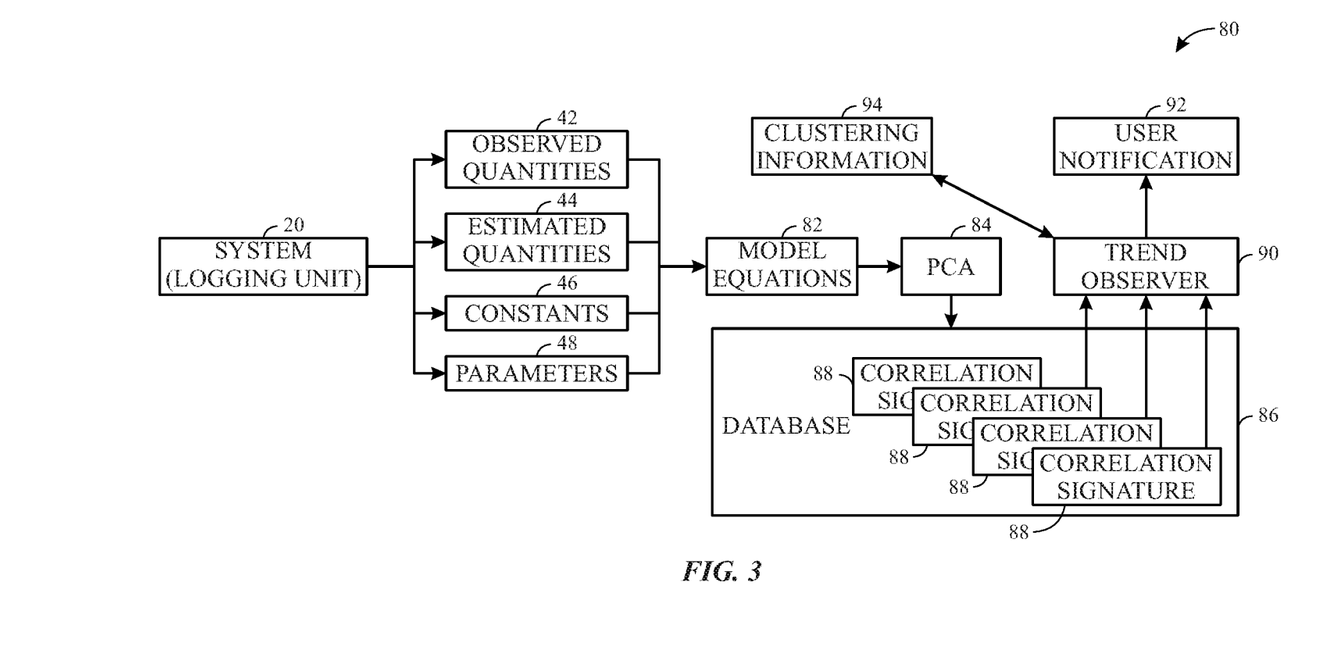
FIG. 3 is a flow diagram of a system to enable efficient preventive maintenance of the logging winch system, in accordance with an embodiment.

The various physical quantities shown in FIG. 2 may be used by a system 80, shown as a flow diagram in FIG. 3, to identify a potentially "failure-prone" operational status of the logging winch system 20. The system 80 may run on the data processing system 28. As shown in FIG. 3, the logging winch system 20 may be described by the observed quantities 42, estimated quantities 44, constants 46, and/or parameters 48. The quantities 42, 44, 46, and/or 48 may be applied in certain model equations 82, examples of which are discussed below, and analyzed for correlations using principal component analysis (PCA) 84 and/or least squares fitting, storing into a database 86 resulting correlation signatures 88. The various correlation signatures 88 describe the relationships between the physical quantities relating to the logging winch system 20 at various points in time. Thus, if a trend observer component 90 identifies that the correlation signatures 88 are trending toward an abnormal relationship, this may suggest that maintenance is called for on the logging winch system 20. The system 80 thus may generate user notifications 92 to indicate the status of the health of the logging winch system 20. Moreover, in some examples, the trend observer component 90 may consider clustering information 94 associated with multiple logging winch units 20. This may allow the trends identified by the trend observer component 90 to be considered in light of other logging winch units 20 that may be operating under similar environmental conditions.

As noted in FIG. 3, the quantities 42, 44, 46, and/or 48 may be applied to model equations 82 that describe the logging winch system 20. In the equations that follow, the "~" sign is used in a broad sense to indicate some kind of correlation between the expressions found on both sides of symbol, without necessarily specifying whether it is linear or other, and disregarding offsets (+ε). Moreover, the term gearbox ratio, as used below, is a unitless quantity much greater than one. The gearbox ratio may be, for example, 40, 100, and so forth.

The equations that are provided below are meant to be examples of equations that may serve as the model equations 82, and should not be interpreted to be part of an exhaustive list. Moreover, the equations below may be varied and adapted appropriately based on the particular components of any specific implementation of a logging winch system 20. In one example, the following equations may include the following:

Pump Displacement*Pump Rotational Speed~Motor Displacement*Motor Rotational Speed;    Equation 1.

Motor Rotational Speed/Gearbox Ratio*Drum Radius~Cable Speed;    Equation 2.

Pump Differential Pressure~Motor Differential Pressure;    Equation 3.

Motor Differential Pressure*Gearbox Ratio~Cable Tension*Drum Radius;    Equation 4.

Prime Mover Power~Generator Pump Power+Winch Pump Power;    Equation 5.

Winch Motor Power~Winch Motor Pressure*Winch Motor Flow Rate;    Equation 6.

With:

Winch Motor Flow Rate~Winch Pump Flow Rate;    Equation 7.

Winch Motor Power~Cable Tension*Cable Speed;    Equation 8.

$d/dt$[Diesel Volume]~Diesel Consumption Rate(for Diesel units);    Equation 9.

Diesel Consumption Rate~Prime Mover Power(for Diesel units);    Equation 10.

Generator Power~Tool Electrical Power; and    Equation 11.

Tool Electrical Power~Tool Electrical Current*Tool Electrical Voltage.    Equation 12.

The degree of accuracy for each of the relationships expressed above as the model equations 82 may be calculated via the PCA component 84 and/or a least squares fitting component. The set of all degrees of accuracy for the relationships together (at least those that make sense in a specific context, e.g. Diesel unit, or Electrical unit), may form a correlation signature 88. Each correlation signature 88 may itself represent a set of several numbers. For instance, each correlation signature 88 may gather all the cross-correlation matrices of the aforementioned relationships, along with the statistical calculations resulting from a primary component analysis (PCA) in the PCA component. The correlation signatures 88 may be stored in the database 86 over time, providing a historical measurement of the relationships between components of the logging winch system 20.

The trend observer component 90 may represent any suitable component that analyzes at least a subset of the correlation signatures 88 for trends over time. The effect of the trend observer component 90 may be better understood in consideration of a flowchart 100 shown in FIG. 4. The flowchart 100 represents an example of a method for identifying a potentially "failure-prone" operational status of the logging winch unit 20. Thus, the flowchart 100 involves collecting quantities relating to the logging winch system 20 (block 102). These quantities may include, for example, the observed quantities 42, estimated quantities 44, constants 46, and/or parameters 48. Relationships between these quantities may be calculated (e.g., using the model equations 82 discussed above) (block 104). Correlation signatures 88 may be determined (e.g., at least partly using the PCA component 84 and/or least squares fitting) and stored into the database 86 (block 106).

Figure 4:
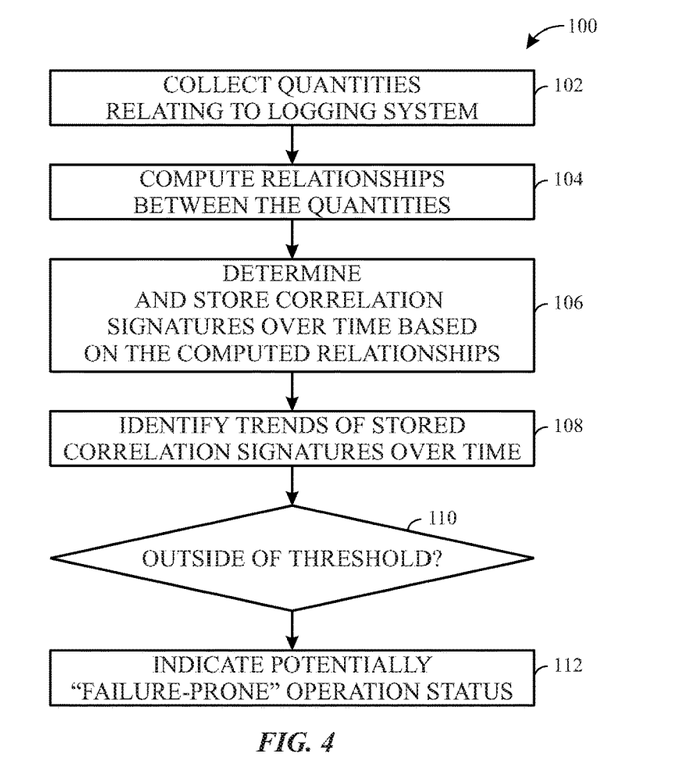
FIG. 4 is a flowchart of a method for identifying potentially "failure-prone" operation status of the logging winch system to enable efficient preventive maintenance, in accordance with an embodiment.

The correlation signatures 88 may thus describe relationships between the various quantities 42, 44, 46, and/or 48 of the logging winch system 20, and thus may be used to indicate when those relationships are changing over time. Accordingly, the trend observer component 90 may identify one or more trends of values in the correlation signatures 88 (block 108). When a trend relating to the correlation signatures 88 falls outside of some defined threshold (decision block 110), a notification 92 may be generated that calls for maintenance of the logging winch system 20 (block 112). Otherwise, blocks 102, 104, 106, and 108 may continue to be carried out. Moreover, by identifying which particular relationships within the correlation signatures 88 are beyond the threshold, particular types of maintenance may be called for.

For example, the role of the trend observer component 90 may be to issue a warning when any of the following thresholds are crossed:

When a correlation signature 88 enters a defined set of values that have been identified to indicate a "failure-prone" operation. The defined set of values may be parameterized by trial and error (e.g., through experimentation or computer modeling) and/or using a clustering method such as described below with reference to FIG. 7.

When the rate of evolution of the correlation signatures 88 with respect to time, or with respect to any other known variable, acquired or estimated, enters a defined set of values indicative of "failure-prone" operation. The defined set of values may be parameterized by trial and error (e.g., through experimentation or computer modeling) and/or using a clustering method such as described below with reference to FIG. 7.

When a linear or non-linear combination of the above enters a predefined set of values indicative of "failure-prone" operation. This defined set of values may be parameterized by trial and error (e.g., through experimentation or computer modeling) and/or using a clustering method such as described below with reference to FIG. 7.

Based on the manner in which correlation signatures 88 are outside of some set of "normal operation" values, the trend observer component 90 thus may also identify which failure mode is more likely to correspond to the direction taken by the deviation. To provide a few examples, deviation on the second equation may indicate either a motor failure, pump failure, hydraulic hose leak, or failure of the Cable Speed sensor (IDW). The example given above represents one relationship between actual components failure mode and deviation in the variables' correlation as shown through the correlation signatures 88, but many more can be drawn through experimentation and/or computer modeling. For example, the systems and methods of this disclosure may be used to identify winch hydraulic pump wear, winch hydraulic motor wear, mechanical gearbox wear, cable tension sensor malfunction, cable speed sensor malfunction, any other outstanding mechanical failure of the winch (which may or may not indicate exactly what is failing), generator hydraulic pump wear, generator hydraulic motor wear, and so forth. Thus, the systems and methods of this disclosure may be used to identify faults, substandard operating modes, wear level, and so forth relating to a logging winch system 20.

Different logging winch systems 20 may be offshore units or land carriers that may operate in a vast range of environmental conditions: extreme cold (e.g., Arctic), extreme hot (e.g., deserts), high temperature and/or high humidity (e.g., tropical locales such as Brazil). The wear and aging of sub-systems in different logging winch systems 20 may thus occur differently. As such, the system 80 shown in FIG. 3 may account for the various environmental conditions under which the different logging winch systems 20 are used. Considering the variety of such conditions, it may be difficult to program all aspects of a maintenance program and predicted health management for every possible environment.

Figure 5:
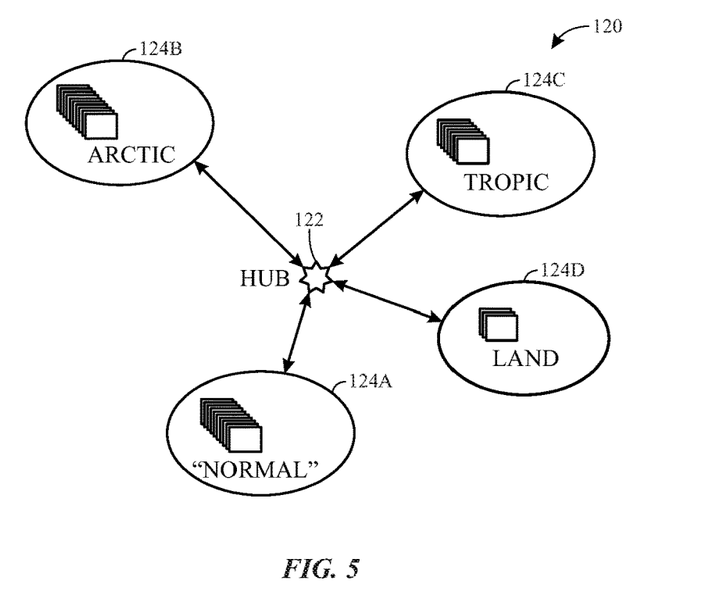
FIG. 5 is a diagram relating clusters of operating status indications of various logging winch systems separated by environmental parameters of their respective operating environments, in accordance with an embodiment.

Accordingly, the system 80 may consider clustering correlation signatures 88 and/or other data associated with the different logging winch systems 20 based on environmental parameters. This is shown in FIG. 5, where a clustering system 120 may use a central hub 122 to collect correlation signatures 88 and/or other data associated with different logging winch systems 20 operating under different environmental conditions. Any suitable environmental conditions may be used to cluster the correlation signatures 88 and/or other data associated with the different logging winch systems 20 into clusters 124. These may include, for example, ambient temperature, humidity level, average vibration level, shock levels, and so forth. The list of environmental parameters may be determined using the principal components analysis (PCA) component 84, which may be based on the sensitivity analysis for a specific prognostics, health, and maintenance model. The clustering may also be done in any other suitable way (e.g., k-means clustering [Kanungo, T.; Mount, D. M.; Netanyahu, N. S.; Piatko, C. D.; Silverman, R.; Wu, A. Y. (2002). "An efficient k-means clustering algorithm: Analysis and implementation-"(PDF). *IEEE Trans. Pattern Analysis and Machine Intelligence* 24: 881-892]). In the example of FIG. 5, the clusters 124 include a normal cluster 124A, an arctic cluster 124B, a tropic cluster 124C, and a land cluster 124D.

Figure 6:
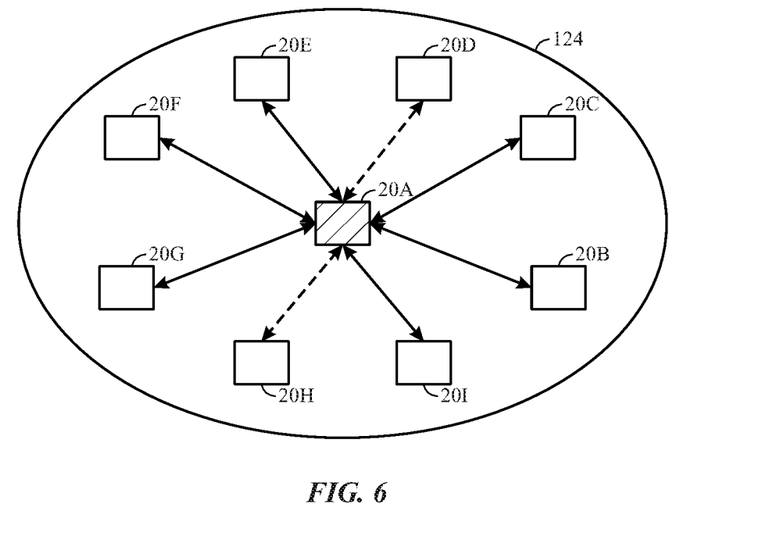
FIG. 6 is a diagram illustrating relationships between operating status indications within a cluster, in accordance with an embodiment.

Within each cluster 124, data from the different logging winch systems 20 of the cluster 124 may have particular relationships. This is shown by way of example in FIG. 6. In this figure, a logging winch system 20A, having data that falls closest to the center of distribution within the cluster 124, may act as a data accumulation and distribution node and may occasionally (e.g., periodically, such as every day) receive a vector of data relating to other logging winch systems 20. These other logging winch systems appear in FIG. 6 as logging winch systems 20B, 20C, 20D, 20E, 20F, 20G, 20H, and 20I.

Figure 7:
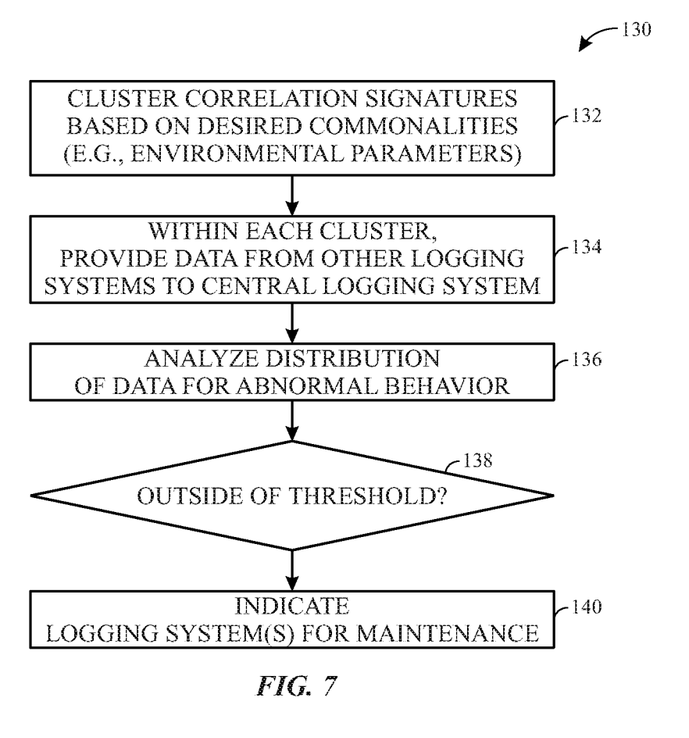
FIG. 7 is a flowchart of a method for identifying potentially "failure-prone" operation status of logging winch systems within a cluster to enable efficient preventive maintenance, in accordance with an embodiment.

As seen by a flowchart 130 of FIG. 7, the hub 122 and/or the central logging winch system 20A may further define when behavior of the logging winch systems 20 are outside of a defined threshold of normal operation. For example, the hub 122 may cluster correlation signatures 88 from different logging winch systems 20 according to desired commonalities, such as related environmental parameters where the logging winch systems 20 into clusters 124 (block 132). Data from logging winch systems 20 within each of the clusters 124 may be provided to a logging winch system 20 of the cluster 124 that is closest to a center of distribution of data of the cluster 124 (block 134). The distribution of correlation signatures 88 and data from the different logging winch systems 20 may be analyzed for any abnormal behavior (block 136). If the correlation signatures 88 and/or data from any of the different logging winch systems 20 falls outside of some threshold (decision block 138), that logging winch system 20 may be identified for maintenance (block 140).

To provide an example, if some parameter from a particular logging winch system 20 ($X_i$) exceeds an average of the cluster ($X_{average}$) by greater than some threshold offset value ($\varepsilon$) (that is, $X_i > X_{average} + \varepsilon$), an alarm may be triggered for a maintenance event. The value of $\varepsilon$ may be defined for every cluster 124 based on any suitable distinguishing feature of the cluster 124 and the parameter under investigation. For example, the environmental conditions may be used, as these may relate particularly to the rate of degradation for certain sub-systems of the logging winch systems 20 of that cluster 124. The central node (e.g., the logging winch system 20A in the example of FIG. 6), after performing the analysis, may thus identify which of the other logging winch systems 20 of the cluster 124 that are due for maintenance and report to the central hub 122 to initiate an appropriate maintenance program.

The specific embodiments described above have been shown by way of example, and it should be understood that these embodiments may be susceptible to various modifications and alternative forms. It should be further understood that the claims are not intended to be limited to the particular forms discloses, but rather to cover modifications, equivalents, and alternatives falling within the spirit of this disclosure.

The invention claimed is:

1. A method comprising:
   collecting, into a processor and with a plurality of sensors, a plurality of different parameters relating to operation of a logging winch system that includes a winch, a power pack configured to supply power to the winch, and a logging cabin;
   computing, using the processor, one or more relationships between the plurality of different parameters using one or more model equations that relate a subset of the different parameters to the operation of the logging winch system;
   determining, using the processor, a first correlation signature that mathematically describes the computed relationships;
   identifying, using the processor, whether the first correlation signature falls outside of a threshold indicative of normal operation of the logging winch system; and
   identifying the logging winch system for maintenance if the first correlation signature exceeds an offset value from the threshold.

2. The method of claim 1, wherein the plurality of different parameters comprises an observed quantity deriving from at least one of the plurality of sensors of the logging winch system, an estimated quantity that is inferable from the observed quantity but not directly measured by the at least one of the plurality of sensors, a constant quantity that is predefined, or a parameter that is provided by an operator of the logging winch system, or any combination thereof.

3. The method of claim 1, wherein the first correlation signature comprises an indication of a statistical degree of exactness of the computed relationships.

4. The method of claim 1, wherein the first correlation signature is determined using principal component analysis or using least squares fitting analysis, or both.

5. The method of claim 1, wherein identifying whether the first correlation signature falls outside of a threshold indicative of normal operation of the logging winch system comprises determining when a set of values of the first correlation signature falls within a defined set of values, wherein the defined set of values indicate a "failure-prone" operation.

6. The method of claim 5, wherein identifying whether the first correlation signature falls outside of a threshold indicative of normal operation of the logging winch system comprises determining a particular failure mode based on which set of values of the first correlation signature falls within the defined set of values, wherein the defined set of values indicate a "failure-prone" operation.

7. The method of claim 6, wherein the failure mode is identified as air, hydraulic, fuel, electrical, or mechanical sub-system of the winch, power pack, or the logging cabin, or any combination thereof.

8. The method of claim 1, comprising performing the collecting, computing, and determining over time to obtain a plurality of correlation signatures over time, wherein identifying whether the first correlation signature falls outside of a threshold indicative of normal operation of the logging winch system comprises determining when a rate of evolution of the correlation signatures with respect to time, or with respect to any other variable, acquired or estimated, enters a defined set of values indicative of "failure-prone" operation.

9. The method of claim 1, comprising performing the collecting, computing, and determining over time to obtain a plurality of correlation signatures over time, wherein identifying whether the first correlation signature falls outside of a threshold indicative of normal operation of the logging winch system comprises determining when a linear or non-linear combination of (1) a set of values of the first correlation signature and (2) a rate of evolution of the correlation signatures with respect to time, or with respect to any other variable, acquired or estimated, falls within a defined set of values that have been identified to indicate a "failure-prone" operation.

10. The method of claim 9, wherein the defined set of values is parameterized using a clustering method in which correlation signatures from other logging winch systems operating in related environmental conditions are clustered and compared.

11. The method of claim 1, wherein the method is performed in the recited order.

12. A system comprising:
   a logging winch system configured to convey a downhole tool into a wellbore on a cable, wherein the logging winch system comprises a plurality of sensors configured to measure a variety of observed quantities relating to operation of the logging winch system; and a data processing system configured to determine correlation signatures that relate the variety of observed quantities to the operation of the logging winch system, to identify when one or more of the correlation signatures indicates abnormal operation, and to identify the logging winch system for maintenance when at least one of the one or more correlation signatures exceeds an offset value from a threshold.

13. The system of claim 12, wherein the plurality of sensors of the logging winch system comprises a set of sensors, at least one of which that measures a motor rotational speed of a motor of the logging winch system that has a gearbox ratio and another of which measures a cable speed, and wherein the data processing system is configured to estimate a drum radius of a drum of the logging winch system and to identify abnormal variations in responses between these physical quantities according to the following relationship:

Motor Rotational Speed/Gearbox Ratio*Drum Radius~Cable Speed, where the "~" sign indicates a linear or non-linear correlation or an offset (+ε), or a combination of both.

14. The system of claim 12, wherein the plurality of sensors of the logging winch system comprises a set of sensors measuring or estimating Pump Rotational Speed, Pump Displacement, Motor Displacement, Motor Rotational Speed of the logging winch system, and wherein the data processing system is configured to identify abnormal variations in responses between these physical quantities according to the following relationship:

Pump Displacement*Pump Rotational Speed~Motor Displacement*Motor Rotational Speed, where the "~" sign indicates a linear or non-linear correlation or an offset (+ε), or a combination of both.

15. The system of claim 12, wherein the plurality of sensors of the logging winch system comprises a set of sensors measuring or estimating Pump Differential Pressure and Motor Differential Pressure of the logging winch system, and wherein the data processing system is configured to identify abnormal variations in responses between these physical quantities according to the following relationship:

Pump Differential Pressure~Motor Differential Pressure, where the "~" sign indicates a linear or non-linear correlation or an offset (+ε), or a combination of both.

16. The system of claim 12, wherein the plurality of sensors of the logging winch system comprises a set of sensors measuring or estimating Motor Differential Pressure, Gearbox Ratio, Cable Tension and Drum Radius of the logging winch system, and wherein the data processing system is configured to identify abnormal variations in responses between these physical quantities according to the following relationship:

Motor Differential Pressure*Gearbox Ratio~Cable Tension*Drum Radius, where the "~" sign indicates a linear or non-linear correlation or an offset (+ε), or a combination of both.

17. The system of claim 12, wherein the logging winch system comprises a prime mover that comprises an electrical motor or a diesel engine, wherein the prime mover dispenses mechanical energy to an electrical generator through a hydraulic pump and motor system, wherein the plurality of sensors of the logging winch system comprises a set of sensors measuring the Prime Mover Power, measuring the Generator Pump Power, and measuring the Winch Pump Power, and wherein the data processing system is configured to identify abnormal variations in responses between these physical quantities according to the following relationship:

Prime Mover Power~Generator Pump Power+Winch Pump Power, where the "~" sign indicates a linear or non-linear correlation or an offset (+ε), or a combination of both.

18. The system of claim 12, wherein the plurality of sensors of the logging winch system comprises a set of sensors measuring or estimating Winch Motor Flow Rate and Winch Pump Flow Rate of the logging winch system, and wherein the data processing system is configured to identify abnormal variations in responses between these physical quantities according to the following relationship:

Winch Motor Flow Rate~Winch Pump Flow Rate, where the "~" sign indicates a linear or non-linear correlation or an offset (+ε), or a combination of both.

19. The system of claim 12, wherein the plurality of sensors of the logging winch system comprises a set of sensors measuring or estimating Winch Motor Power, Winch Motor Differential Pressure, and Winch Motor Flow Rate of the logging winch system, and wherein the data processing system is configured to identify abnormal variations in responses between these physical quantities according to the following relationship:

Winch Motor Power~Winch Motor Differential Pressure*Winch Motor Flow Rate, where the "~" sign indicates a linear or non-linear correlation or an offset (+ε), or a combination of both.

20. The system of claim 12, wherein the plurality of sensors of the logging winch system comprises a set of sensors measuring or estimating Winch Motor Power, Cable Tension, and Cable Speed of the logging winch system, and wherein the data processing system is configured to identify abnormal variations in responses between these physical quantities according to the following relationship:

Winch Motor Power~Cable Tension*Cable Speed, where the "~" sign indicates a linear or non-linear correlation or an offset (+ε), or a combination of both.

* * * * *